United States Patent Office 3,454,466
Patented July 8, 1969

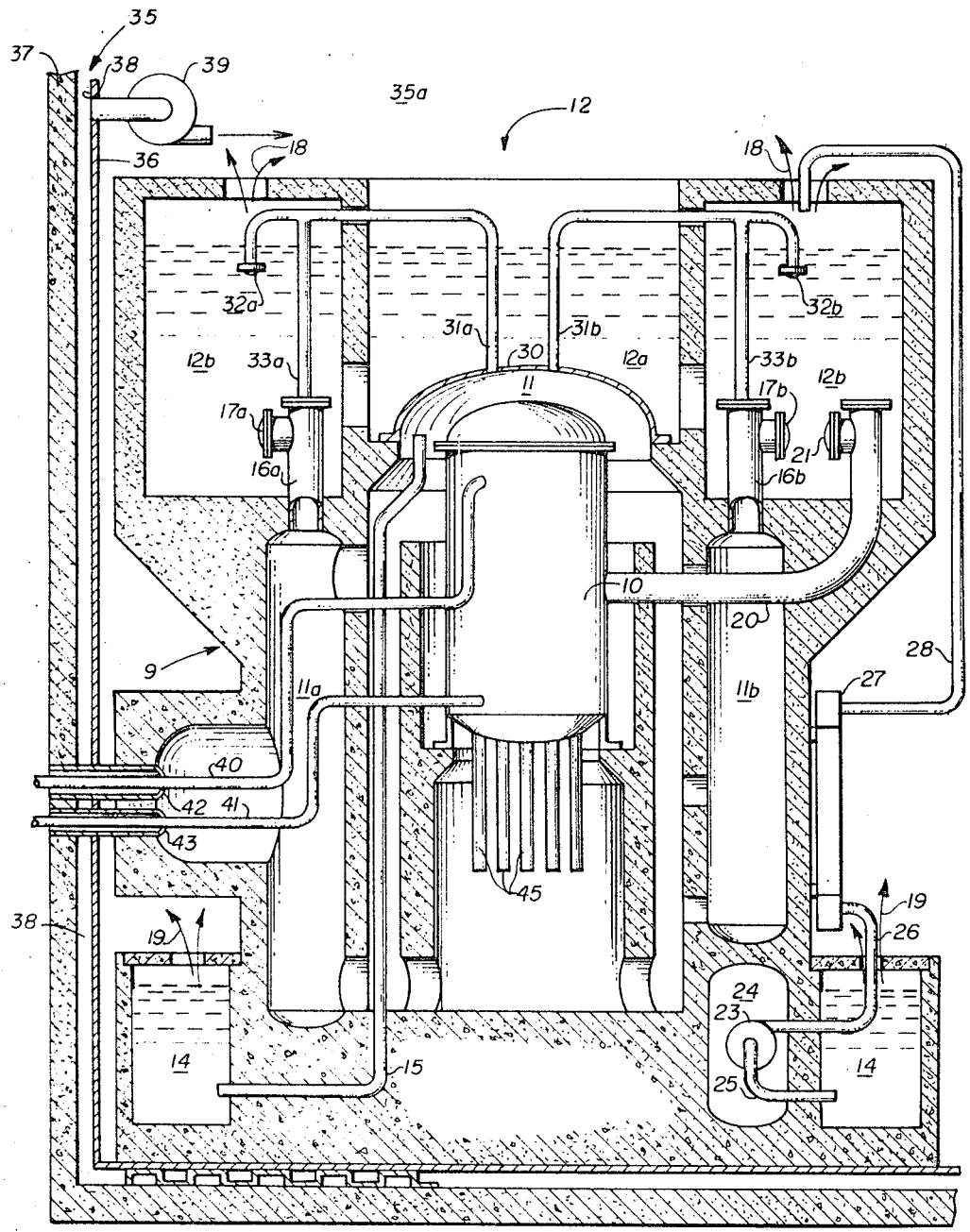

3,454,466
NUCLEAR REACTOR CONTAINMENT SYSTEM FOR METROPOLITAN SITES
William A. Pitt and Ralph B. Lemon, San Jose, Calif., assignors to the United States of America as represented by the United States Atomic Energy Commission
Filed Dec. 29, 1967, Ser. No. 694,538
Int. Cl. G21c *15/18*
U.S. Cl. 176—38           5 Claims

ABSTRACT OF THE DISCLOSURE

A concrete structure having three compartments is used to contain a nuclear reactor and its primary coolant system. The first compartment, a dry well, is centrally located and completely encloses the pressure vessel. A second compartment, filled with a liquid, is at a hydrostatic level above the first compartment. The third compartment, also filled with a liquid, is at a hydrostatic level below the first compartment. A first conduit communicates the first compartment with the third compartment for slow leaks. A second conduit, sealed with a rupture disc, communicates the first compartment with the second compartment upon rupture of the primary coolant system. A third conduit, sealed with a rupture disc, communicates the pressure vessel with the second compartment upon a large overpressure transient within the pressure vessel. Both hydrostatic compartments are vented to a common gas volume formed by an outer containment structure or reactor building.

Background of the invention

The invention described herein was made in the course of, or under, Contract No. AT(10-1)-205, Subcontract C-610, with the United States Atomic Energy Commission.

This invention relates in general to nuclear reactors and nuclear reactor power generating systems, and in particular, to reactor damage prevention and prevention of release of radioactive materials.

Because of public concern for the real and imaginary dangers with respect to the siting of commercial nuclear power generating plants, nuclear reactor installations have in the past been designed and located with utmost concern for safety. The fact that no commercial power reactor in the United States has ever suffered any accident which resulted in a release of radioactive material has not reduced the effort to maximize the reliability to 100% and guarantee that no radioactive material is released which would endanger living entities located outside the immediate exclusion area surrounding the reactor power plant. One purpose of the present invention is to further approach that guarantee of 100% reliability.

It must be understood that no power generating thermal or high energy neutronic reactor is capable of exploding in the high order detonation manner of a bomb because the conditions within the reactor core and the concentration of fissionable material necessary for such a high order reaction are generally avoided. However, any sudden increase in reactivity within the core of a nuclear reactor causes a sudden temperature increase within the core, which in turn causes a sudden or flash vaporization of coolant, resulting in an overpressure transient. If the pressure increase from the sudden vaporization of the coolant is high enough to exceed the strength of the metals in the primary coolant system which includes the pressure vessel and primary system piping, loss of coolant from the primary system and the core could occur. In such a case, release of the steam would come first. Release of radioactive material would result only if auxiliary means of cooling the core also fail and the energy release in the the uncooled fuel is great enough to melt or otherwise rupture the fuel cladding. The radioactive material would then be released outside the primary system after, rather than before or during, the initial release of vaporized coolant, which, for the presently described embodiment, is boiling water and steam. To prevent environmental dispersion of fission products, etc., and to contain the energy of the possible steam release, the structures of the prior art that housed the reactor pressure vessel generally were designed so that the pressure vessel and primary system piping were contained in a sealed and centrally located dry well proximate a pool of water at a hydrostatic level approximately the same as that of the pressure vessel. If the pressure inside the primary system exceeded the safe level and a rupture occurred, the steam escaping into the dry well caused rupture discs to break and exhaust the steam into the tank of surrounding water. The water absorbed both kinetic and thermal energy of the steam. In absorbing the thermal energy, the steam was condensed immediately so that no appreciable overpressure transient was felt immediately adjacent to the structure containing the pressure vessel. Any fission products which followed the steam were also absorbed in the water and prevented from being released from the structure housing the reactor.

To offer a further safeguard, a secondary containment building usually housed the structure that contained the primary system so that in the event radioactive material did escape from the first containment structure, the second structure would prevent any further release.

Summary of the invention

The present invention improves on the containment structures of the prior art in that a second pool of liquid is provided to absorb the energy from small or slow leaks which might develop in the primary coolant system or high pressure steam lines entering the pressure vessel. In addition, the first pool at a hydrostatic level above the vessel is vented to a very large gas volume in a plenum enclosed and defined by the reactor building. Acting together, the arrangement functions as a variable gas volume containment, such that after pressure suppression, the water floods the dry well and thus causes the pressure in the gas plenum to not increase.

The apparatus of the present invention comprises basically a first compartment, or dry well, containing the primary coolant system which includes the nuclear reactor pressure vessel and primary system piping, a second compartment for containing a liquid for intermixing with coolant, vapor and/or fission products released from the primary coolant system at a hydrostatic level above the first compartment, a third compartment for containing a similar liquid at a hydrostatic level below the first compartment, conduit means for communicating the first with the third compartment, conduit means for communicating the first with the second compartment upon rupture of the pressure vessel, conduit means for equalizing the pressure between the first and second compartments after release of primary coolant, means communicating the pressure vessel with the second compartment upon exceeding a predetermined pressure in said vessel, means for pumping and cooling liquid from the third compartment to the second compartment upon flooding of said dry well with liquid from said second compartment, all contained in a large building or container which provides a common gas containment to which the second and third compartments vent.

It is therefore an object of this invention to provide an apparatus for containment of a nuclear reactor under any conditions involving the release of vaporized coolant and radioactive material.

It is another object of this invention to provide an apparatus for containment of vaporized coolant and radioactive material issuing from a nuclear reactor.

It is a further object of the this invention to provide an apparatus for containment of both small and large releases of vaporized coolant and radioactive material from a nuclear reactor.

It is another object of this invention to provide an apparatus for absorbing the radioactive material and vaporizing coolant issuing from a nuclear reactor.

It is still another object of this invention to suppress the release of pressurized coolant vapor and radioactive material to avoid a pressure increase in the building containing the apparatus of this invention.

It is another object of this invention to minimize the gas pressure in the secondary reactor containment building (or suppression chamber gas space) to minimize leakage from said building.

Other and more particular objects of this invention will be manifest upon study of the following detailed description when taken together with the accompanying drawing.

*Brief description of the drawing*

The single figure is a section through the reactor containment apparatus of this invention, showing the three compartments used for the containment of the pressure vessel and liquids.

*Description of the preferred embodiment*

With reference to the drawing, primary containment structure 9 is, for the present embodiment, a concrete structure in which nuclear reactor pressure vessel 10 is housed in a sealed first compartment, or dry well, 11. Ancillary compartments 11a and 11b intercommunicate with dry well 11, and contain piping and miscellaneous ancillary reactor equipment (not shown), such as circulating pumps, instrumentation, etc., which equipment forms no part of this invention. For the present embodiment, the nuclear reactor contained in pressure vessel 10 is either a boiling water, pressurized water, or steam superheating reactor.

A second compartment 12 containing a liquid, which for the present embodiment is water, is disposed at a hydrostatic level above dry well 11, and comprises two interconnecting tanks 12a and 12b, vented to the reactor building gas plenum 35a, as indicated by arrows 18.

A third compartment 14, also containing water, is disposed at a hydrostatic level below dry well 11, and, in the present embodiment, defines an annular tank and is also vented to the reactor building gas plenum 35a, as indicated by arrows 19.

A first conduit 15 communicates the upper region of dry well 11 near the top of pressure vessel 10 with third compartment or tank 14.

A pair of second conduits 16a and 16b at the top of ancillary compartments 11a and 11b, respectively, are sealed at their upper ends with rupture discs 17a and 17b, respectively. When discs 17a and 17b rupture, compartments 12 and 11 become interconnected so that steam in compartment 11 can blow out into compartment 12, after which the water in compartment 12 floods down into compartment 11, and inundates pressure vessel 10. Thus the volume of water in tank 12 must be approximately equal to the volume of compartments 11, 11a and 11b, and preferably also of such a volume and low temperature for absorbing all of the released energy and residual energy in the reactor core without vaporizing to produce excessive pressure. After the water has flooded the dry well, the now empty compartment 12 has added to the volume of the reactor building (35a) by an amount equal to that of the dry well before flooding. The resulting building pressure is therefore very low.

A third conduit 20, sealed at its upper end with rupture disc 21 and connected at its lower end to pressure vessel 10, provides a means of communication between pressure vessel 10 and tank 12 when disc 21 ruptures, a means that bypasses compartment 11.

Pump 23 in chamber 24 in the lower portion of primary containment structure 9 is arranged to pump water from tank 14 through heat exchanger 27 into tank 12.

To equalize liquid level between tanks 12 and dry well 11, dry well cover dome 30, which defines the bottom of tank 12a, is penetrated by one end of conduits 31a and 31b. The opposite ends of conduits 31a and 31b are sealed with rupture discs 32a and 32b, respectively, and depend into tank 12b, slightly below the surface of the liquid therein. Conduits 33a and 33b connect conduits 32a and 32b, respectively, to the top of conduits 16a and 16b.

Enclosing the entire primary containment structure 9 in a sealed relationship is reactor building or secondary containment structure 35 defining gas plenum 35a, comprising an inner impermeable shell 36 spaced apart from outer concrete shell 37 to define a plenum 38. Plenum 38 may be evacuated by pump 39, which exhausts back into secondary containment structure 35.

Primary steam conduit 40, in association with feedwater conduit 41, are provided with high pressure conduit seals 42 and 43, respectively, where they penetrate the concrete wall of primary containment structure 9.

Below pressure vessel 10 are the control rod drives 45 used in maintaining the reactor at its proper power level.

Under normal operation, pressure vessel 10 may operate at 1000 p.s.i. and higher. Dry well 11 and ancillary compartments 11a and 11b remain sealed from tank 12 by rupture discs 17a and 17b. Tank 12, i.e., tanks 12a and 12b, is filled with a sufficient volume of liquid, as previously discussed, to fill dry well 11 and ancillary compartments 11a and 11b, up to the level of the conduit 15.

Tank 14 is also filled with a liquid, and conduit 15 is arranged with its upper end at a hydrostatic elevation above the water in tank 14, so that, applying the principle of the barometer discovered by Torricelli, no amount of vacuum or suction at the top opening of conduit 15 will be able to draw water out of tank 14, up conduit 15, and into dry well 11.

In the event of a small leak, such as a leak in the primary coolant system (pressure vessel 10 or steam lines 20 or 40), the pressure in dry well 11 and compartments 11a and 11b will increase slowly. The only avenue of relief which is not blocked by a rupture disc is through conduit 15. For small flow rates that can be carried by conduit 15, all steam passing through conduit 15 into tank 14 will be condensed and absorbed by the water therein. The air forced out of compartments 11, 11a and 11b will bubble through and enter the space between secondary containment building 35.

Under ordinary conditions of a slow leak, there will normally be little or no radioactive material mixed with the steam entering tank 14, but in the event there is, the water in tank 14 will absorb all soluble radioactive materials. To enhance the absorption of acidic fission products, the water in tank 14 may be made alkaline.

In the event of a large and sudden release of thermal energy within the reactor core (not shown) contained within pressure vessel 10, two avenues of pressure relief are available through the apparatus of this invention.

As for the first avenue of relief, should the increase in pressure through coolant voiding, i.e., flash vaporization of the water, be of such a character and rate as not to rupture the primary system, pressure relief is ordinarily achieved through conduit 20. Upon reaching a predetermined pressure, rupture disc 21 at the end of conduit 20 in tank 12b will rupture, venting first steam, and then any fission products, into the water therein. The water will immediately absorb the steam and soluble fission products, Since there is only steam and no air in pressure vessel 10, little or no pressure increase will occur in secondary containment building 35, since all of the steam is condensed and its energy absorbed by the water in tank 12, i.e., tanks 12a and 12b.

After the pressure in vessel 10 is relieved, water from tank 12b will then backflow by gravity, since it is at a higher hydrostatic level above dry well 11 and reactor vessel 10, to thermally quench the core (not shown) and additionally wash any fission products back into pressure vessel 10.

As for the second avenue of pressure relief, should the increase in pressure through coolant voiding, i.e., flash vaporization of the water, be of such a character and rate as to cause the primary system to rupture, there would be a corresponding increase in pressure in dry well 11 and ancillary compartments 11a and 11b. In this event, rupture discs 17a and 17b are designed to rupture at a predetermined pressure which is dependent upon the structural design of primary containment structure 9. In addition, rupture discs 32a and 32b are also designed to rupture at the same pressure as discs 17a and 17b. Disc 21 may also rupture, but such event will not limit the function of the other two rupture discs or conduits.

Although some steam and air is forced through conduit 15 and absorbed in the water in tank 14 to increase the temperature of the water therein, the bulk of the steam and air passes through conduits 16a and 16b and, if disc 21 has ruptured, also through conduit 20, into tank 12b where the steam is condensed, its energy absorbed, and the air is released into secondary containment building 35.

After initial exhaustion of steam and air from dry well 11, the water from tank 12, i.e., tanks 12a and 12b, floods down into dry well 11 and ancillary compartments 11a and 11b, entraining any radioactive materials which are attempting to escape therefrom.

It will be noted that the change in volume of water in tank 12 is essentially equal to the air initially exhausted into secondary containment building 35. In other words, the air in dry well 11 is replaced by the water from tank 12, and the water from tank 12 is replaced by the air from dry well 11. Under these conditions, during the period of exhausting air from dry well 11 and the back-flooding of water therein, secondary containment building 35 will experience only a slight transient increase in pressure.

The gas volume 35a is very large as compared to the amount of air released into it, and is equal to the volume of water flooded into the dry well, resulting in little or no building pressure increase after the event. If the dry well were operated at a vacuum, then the resultant building gas volume 35a would result in a slightly negative gage pressure after the event.

After a rupture of the primary system and after flooding of dry well 11, the pressure within secondary containment building 35 will be essentially as it was before rupture of vessel 10. There will be no appreciable positive pressure within secondary containment building 35 which would force radioactive material through shells 36 or 37. Further assurance that no radioactive materials will escape is afforded by vacuum pump 39 which exhausts any gases leaking into plenum 38 between shells 36 and 37, back into containment building 35, where other apparatus (not shown) may extract the radioactive materials from the air.

Under certain circumstances, it might be possible for only steam to remain in dry well 11, such that when it condenses, water will be sucked up from ancillary compartments 11a and 11b, into dome 30, and above the level of the upper end of conduit 15. In this event, such water would pass through conduit 15 and flood into tank 14.

To equalize the water level in dry well 11 so that it reaches, but does not exceed, the top of conduit 15, conduits 31a and 31b, and 33a and 33b, are arranged to interconnect the upper region of dry well 30 and the tops of conduits 16a and 16b, respectively, with tank 12, through dome 30.

When discs 17a, 17b, 32a and 32b rupture and water from tank 12 floods down into dry well 11 and compartments 11a and 11b through conduits 16a and 16b, air will be drawn into conduits 31a and 31b as soon as the water level in tank 12 recedes below their opening at rupture discs 32a and 32b, respectively. The air drawn into conduits 31a and 31b will pass into the upper region of dry well 11 under dome 30. Any vacuum created by the condensing of steam under dome 30 will be relieved by this influx of air. This influx of air into dry well 11 is also an assurance that no fission products will escape from this region. Since some steam and hot water will overflow through conduit 15 into tank 14 and thus raise the temperature of the liquid in tank 14, and since it is also desirable to provide a system for cooling the water formerly in tank 12 that has absorbed the considerable amount of energy of the released coolant, a system for pumping and cooling liquid from tank 14 to tank 12 is provided, and comprises an inlet conduit 25 at tank 14, which is connected to a pump 23 in chamber 24, a pump output conduit 26 supplying heat exchanger 27, which in turn supplies an outlet conduit 28 emptying the cooled water into tank 12b.

Determining the volume of water in tank 12 necessary to quench any reactor failure, the volume of water must be sufficient in an amount that will absorb all the energy of the reactor through increase in its temperature below the point where it is converted to steam. Thus, by virtue of the cooling system, previously described, water is pumped and cooled from tank 14, and passes into tank 12, then into dry well 11 through ancillary compartments 11a and 11b, where it intermixes with and replaces hot water, which then overflows into conduit 15 and back to tank 14, where the cycle is repeated. Thus, cooling is accelerated so that reentry can be made as soon as possible into containment building 35 for repair of the reactor.

Although the foregoing embodiment has been described in detail, there are obviously many other embodiments and variations in configuration which can be made by a person skilled in the art without departing from the spirit, scope, or principle of this invention. Therefore, this invention is not to be limited except in accordance with the scope of the appended claims.

We claim:

1. A nuclear reactor containment and suppression apparatus, comprising a first compartment defining a dry well for containing said nuclear reactor, a second compartment disposed at a hydrostatic level above said first compartment and containing a liquid therein, a third compartment disposed at a hydrostatic level below said first compartment and containing a liquid therein, a first conduit communicating the upper region of said first compartment with said third compartment, and means communicating said first compartment with said second compartment upon exceeding a predetermined pressure in said first compartment.

2. The apparatus as claimed in claim 1, wherein said means for communicating said first compartment with said second campartment comprises a second conduit communicating said first compartment with said second compartment, and a disc, rupturable upon exceeding a predetermined pressure difference between said first and second compartments, attached in sealed relation to said second conduit.

3. The apparatus as claimed in claim 1, further comprising means for pumping liquid from said third compartment to said second compartment, and means for cooling said liquid being pumped from said third compartment to said second compartment connected to said pumping means.

4. The apparatus as claimed in claim 1, further comprising means for communicating said nuclear reactor directly with said second compartment upon exceeding a predetermined pressure inside said pressure vessel.

5. The apparatus as claimed in claim 2, further comprising means for communicating with the upper region of said first compartment for equalizing hydrostatic pressure between said first compartment and said second compartment when said disc ruptures.

References Cited

UNITED STATES PATENTS 3,115,450  12/1963  Schanz _____ 176—37
3,168,445  2/1965   Ziegler et al.

BENJAMIN R. PADGETT, *Primary Examiner.*

U.S. Cl. X.R.

176—63